April 5, 1960     R. E. NOVKOV     2,931,659
QUICK CHANGE TOOL HOLDER
Filed Feb. 12, 1958
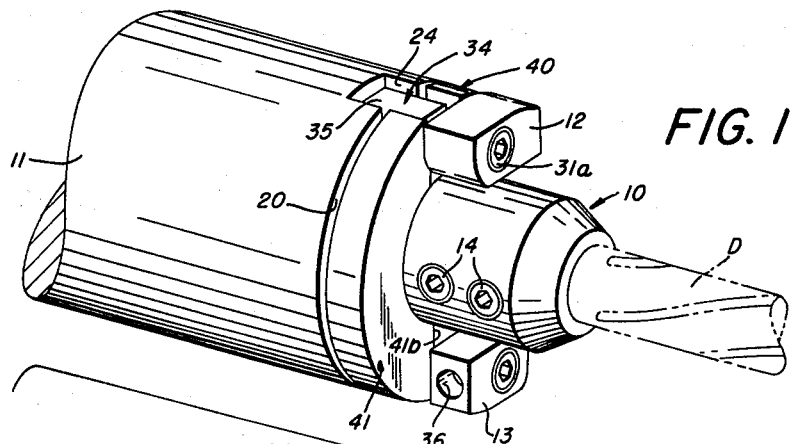
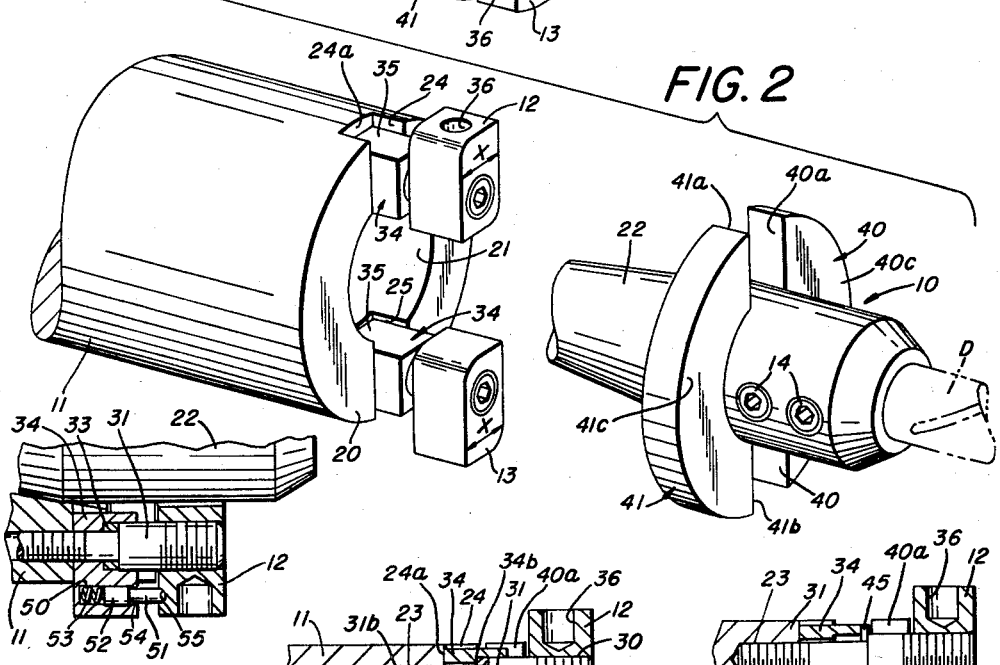
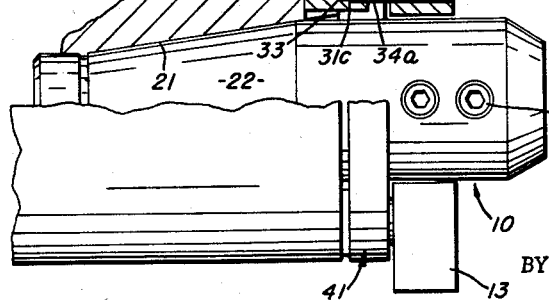
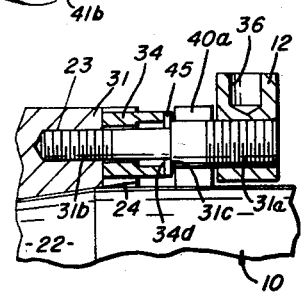
INVENTOR.
RAYMOND E. NOVKOV
BY
J. William Freeman
ATTORNEY

United States Patent Office 2,931,659
Patented Apr. 5, 1960

2,931,659

QUICK CHANGE TOOL HOLDER

Raymond E. Novkov, Akron, Ohio, assignor to Portage Double-Quick Inc., Akron, Ohio, a corporation of Ohio Application February 12, 1958, Serial No. 714,770

7 Claims. (Cl. 279—35)

This invention relates to the art of machine tool holders, and in particular, relates to a tool holder wherein a quick change may be made from one tool to another with a minimal amount of lost time.

For some time past, the prior art has taught the use of tool holders that are attached to and operably supported by a machine tool. A typical illustration of such a tool holder arrangement is found in the conventional drill press, where a tool holder is provided on the rotating spindle, so as to receive a drill or cutting bit therein.

In the earliest forms of the prior art, the machine tool per se, is normally held in place with regard to the rotating spindle, by the use of an elongated bolt, that projects from the tool so as to extend through the spindle. The exposed or projecting end of the bolt is then secured in place by a nut so as to lock the tool in place with respect to the spindle. While this type of arrangement is to some extent satisfactory, it is believed apparent that a great deal of time is consumed in changing tools during machining operations, since it is necessary that during each change that the elongate bolt be removed with respect to the spindle before the cutting tool could be disassociated therewith.

In recent years, attempts have been made to reduce the amount of time required to effectuate change of cutting tools. In the main, these efforts have been directed towards the use of a releasable type of mechanical interlock between the tool holder containing the tool, and the spindle that in turn receives the tool holder.

A typical example of a tool holder of the general classification, is set forth in U.S. Patent 2,611,621, issued to E. M. Patterson on September 23, 1952. In this patent, the tool holder is seated within a tapered socket and upon rotation of a locking nut through a predetermined amount of rotational movement, the tool holder is locked in place with respect to the spindle.

While the above device has been found to possess several advantages, it has also been found to have disadvantages from other standpoints.

First, because the tool holder must be accurately seated within a slot provided for this purpose, it is important that the seat be at all times kept clear of chips and other foreign substances that might interfere with the proper fitting of the tool holder. In this regard, it has been found that frequently chips will clog the area between the nut and the tool holder to render difficult the release and/or positioning of the same with regard to the spindle.

As a second disadvantage, it is of course, apparent that the use of the rotatable locking nut having a special cutout and contour, dictates the use of a special formed spindle for cooperation therewith. Accordingly, present day spindles on existing machine tool equipment, are not utilizable with the rotatable locking nut of the invention, with the result that an entirely new spindle, appropriately shaped in contour, must be proved in each instance.

As a third and principal disadvantage of this type of unit, it is believed manifest that the same requires the presence of an additional part in the form of an adaptor unit that interconnects the spindle with the tool holder. In this regard one component of the adaptor unit is normally seated in the tapered bore of the spindle with a bolt usually extending through the spindle and being attached at its free end with a bolt. This component normally has a tapered seat for receiving the tool holder in concentricity therewith and additionally has a threaded external surface upon which is engaged the remaining component in the form of a locking ring, with this locking ring obviating axial or separating of the holder from the adaptor.

It will thus be seen that units of this type require relatively large number of component adaptor parts to permit usuage of the same.

It has been found that the aforementioned disadvantages can be obviated by modifying the existing spindle equipment, so that coaction with an appropriately shaped tool holder can be achieved. Specifically, by providing locking lugs on existing spindles, it has been found that the same can be employed in connection with a tool holder of the type hereinafter described, with mechanical interlocking of the tool holder and tool, with respect to the spindle, being achieved upon movement of the locking lugs, as will hereinafter be described.

It accordingly becomes the principal object of this invention to provide a new and improved type of quick-change tool holder, that is characterized by the fact that the same can be adapted to use with conventional spindles with a minimal amount of effort and expense.

It is a still further object of this invention to provide a new and improved type of quick-change tool holder that is low in cost and efficient in operation, while simultaneously being capable of a mechanical interlock with conventional spindles.

These and other objects of the invention will become more apparent upon a reading of the following brief specification, considered and interpreted in the light of the accompanying drawings.

Of the drawings:

Figure 1 is a perspective view showing the improved tool holder locked within a machine tool spindle.

Figure 2 is a similar perspective view, but illustrating the component parts in their disengaged position.

Figure 3 is a sectional view of the assembled spindle and tool holder, with the component parts being positioned in unlocked condition.

Figure 4 is a fragmentary section similar to Figure 3, but illustrating a modified form of the invention.

Figure 5 is a fragmentary section similar to Figure 4, but illustrating a further modification of the invention.

Referring now to the drawings and in particular to Figures 1 through 3 thereof, the approved tool holder, generally designated by the numeral 10, is shown telescopically seated within a machine tool spindle 11, with the tool holder 10 being mechanically interlocked with spindle 11 by locking lugs 12 and 13, as will hereinafter be described. For environmental purposes, the tool holder 10 is shown receiving a drill D, with this drill D being retained with respect to tool holder 10 by the use of conventional set screws 14, 14.

Considering first the structure of the spindle 11, it will be seen that the same is of generally elongated, circular configuration, so as to define an axial end wall 20, from which extends axially inwardly, a tapered seat 21; the arrangement being such that equivalent tapered external surface 22 of tool holder 10 can be seated against surface 21 when the component elements are interlocked, as shown in Figures 1 and 3. In this regard, the spindle 11 is conventional to the point just described, and further in this regard, as is customary and conventional in spindles of this type, there are included diametrically opposed tapped apertures 23, 23 that extend axially of spindle 11 from face 20, with one such aperture 23 being shown clearly in Figure 3 of the drawings. Additionally, and for the purpose of supporting the locking lugs 12 and 13, as will hereinafter be described, the end face 20 is shown provided with diametrically opposed, axially extending, slots 24 and 25, with these slots being disposed in the region of apertures 23, 23.

Since the construction of each locking lug 12 and 13 is identical, as is the construction of the component parts associated therewith, a description of one such locking lug will be undertaken, it being understood that the construction of the remaining locking lug 13 will be similar. Accordingly, and referring to Figure 3, it will be seen that the locking lug 12 is provided with an eccentrically located tapped aperture 30, within which is threaded one axial end 31a of stud bolt 31, the remaining threaded end 31b being threaded within tapped aperture 23, as clearly shown in Figure 3 of the drawings. In this regard, the axial segment 31b is preferably illustrated being of a smaller diameter of threaded segment 31a, with the result that these segments 31a and 31b will define a shoulder 31c against which is received a washer 33, as shown in Figure 3. Concentrically disposed about each segment 31b is a driving key 34, contoured in the form of a sleeve and having a cylindrical internal wall that is undercut to define a shoulder 34b; with this shoulder 34b seating against the remaining surface of washer 33. One axial end of the sleeve 34 bears against the undercut face 24a of slot 24, while the remaining end thereof is not in contact with any of the component parts described. In this manner, the washer 33 limits the penetration of portion 31c in aperture 23 so that the lugs 12 and 13 will each rotate relatively and move axially of threaded portions 31c, 31c.

Preferably, and as indicated best in Figure 2, the external surface of sleeve 34 is provided with flat faces 35, 35 which fit within the slot 24 and also interlock with tool holder 10 as will hereinafter be described. Additionally, to facilitate turning movement of the locking lugs 12 about the pivot point that is defined by bolt 31, each lug 12 and 13 further includes a bore 36 within which a conventional wrench or turning tool may be positioned to effectuate rotational movement.

Turning next to the construction of the tool holder 10, it will be seen that the same, in addition to the tapered surface 22, further includes a pair of radially extending flanges 40 and 41, with each flange being substantially semi-circular in planar configuration; the arrangement being such that the arcuate ends of each flange are defined by end surfaces 40a, 40b and 41a and 41b, with the space between the edge surfaces 40a and 41a being larger than the width dimension X of each lug 12 and 13, so as to permit the tool holder 10 to be telescopically seated and interlocked with the spindle 11 when the lugs 12 and 13 are positioned as shown in Figure 2. In this regard, it is believed manifest that the faces 35, 35 of sleeves 34, 34 will be in coplanar abutment with surfaces 40a, 40b and 41a, 41b so as to prevent relative rotational movement between holder 10 and spindle 11.

In use or operation of the improved tool, it will first be assumed that the drill D has been positioned with respect to the tool holder 10, and that the same has been locked in place by tightening of the set screws 14, 14. At this time, it is merely necessary that the lugs 12 and 13 be positioned as shown in Figure 2, and when the component parts are so positioned, the tool holder 10 together with the drill D can be moved as a unit, concentrically of spindle 12, so as to effectuate a seating of surface 22 against tapered seat 21.

When this position has been reached, it is merely necessary that a turning tool be inserted in aperture 36 of lug 12. Upon rotation of lug 12 90° to the position of Figure 1, it is believed apparent that lug 12, because of its movement axially of bolt 31 upon such rotation, will be drawn against end surfaces 40c and 41c of flanges 40 and 41 respectively, to thus effectuate a firm engagement between these surfaces, with washer 33 determining the point of locking contact. It is believed apparent that a similar rotatable movement of the lug 13 will result in this lug being drawn up against surfaces 40c and 41c of flanges 40 and 41 respectively, at which time the tool holder 12 and drill D will be firmly mechanically interlocked within the spindle. It is of course, manifest that the thickness of the washer 33 will determine the amount of lug rotation before locking. Accordingly, the washer can be ground as required.

During use of the tool, it is believed apparent that a mechanical interlock against rotation will be provided by the engagement of sleeves 34, 34 between flanges 40, 41, while any axial movement of the tool holder 10 relatively of spindle 11 will be obviated by the interference of the lugs 12 and 13 with the flanges 40 and 41.

When it is desired to separate the tools, it is merely necessary that the lugs 12 and 13 be rotated to the position of Figure 2, at which time the tool holder 10 can be moved axially away from the spindle 11 and thus separated as shown in Figure 2.

It will be seen from the foregoing that there has been provided a new and novel type of quick-change device for machine tools which is characterized by the fact that the same utilizes many of the existing features of standard spindles of the type now known. It has accordingly been shown how the improved device is adapted for use with conventional spindles with a minimal amount of rework, while still providing an efficient type of quick-change attachment.

The modified form of the invention shown in Figure 4 is similar in most respects to that previously discussed above in connection with Figures 1 through 3, and accordingly, where indicated like numerals will designate like parts. In this modification of the invention, it will accordingly be seen that a washer 45 is seated against shoulder 31c as before, with the washer 45 being of a larger diameter than was the previously described washer 33. In this manner, the washer 50 will bear against axial end 34d of sleeve 34 instead of being received against shoulder 34b, as was the case in Figures 1 to 3. As before, however, the sleeve 34 has clearance with respect to threaded segment 31b, and in this manner, the same may be shifted relatively thereof, during loosening of the component parts as has been previously described.

Referring now to Figure 5, it will be seen that this modification of the invention contemplates the use of a locking mechanism in connection with the above-described parts. Thus, where indicated, like numerals designate like parts.

Accordingly, it will be seen that each sleeve 34 is provided with a bore 50, with a pin 51 having a head 52 being received in bore 50 and being urged outwardly to the adjacent lug 12 or 13 by a spring 53; the arrangement being such that the projecting end of the pin 57 seats in depressed portion 55 of lug 12 or 13, while peened edge 54 retains the pin head 52 within bore 50 as shown.

In this manner when the lug is rotated and pin 51 is snapped into area 55 thereof, rotation will be restricted with the result that the lugs 12 and 13 will be perfectly aligned for reception of tool holder 10.

While a full and complete description of the invention has been set forth in accordance with the dictates of the patent statutes, it is to be understood that the invention is not limited to the specific form, shape and/or design above-described.

What is claimed is:

1. A quick-change tool holder of the character described, comprising; a rotatable member having an axial end and a tapered socket extending axially inwardly therefrom; at least one driving key carried by said axial end and projecting axially thereof; at least one pin element projecting axially of said driving key; at least one clamping lug carried on the projecting end of said pin member and being rotatable around the axis of said pin; a tool holder adapted to concentrically seat within said socket and having a radial wall intermediate its axial ends; said radial wall having at least one radial slot provided therein whereby said slot of said radial wall may be positioned around said driving key at a point between said axial end and said clamping lug; said clamping lug being rotatable relatively of said socket, said driving key and said pin and overlying said radial wall upon rotataion thereof, whereby axial separation of said member and said holder seated therein is prevented.

2. The device of claim 1 further characterized by the fact that said clamping lug is movable axially towards said axial end when rotation thereof around said axis of said pin.

3. A quick-change tool holder of the character described, comprising; a rotatable member having an axial end and a tapered socket extending axially inwardly therefrom; at least one driving key carried by said axial end and projecting axially thereof; at least one pin element projecting axially of said driving key; at least one clamping lug carried on the projecting end of said pin member and being rotatable around the axis of said pin; a tool holder adapted to concentrically seat within said socket and having a radial flange intermediate its axial ends; said flange having at least one radial slot extending inwardly from its peripheral edge whereby said slot of said flange may be positioned around said driving key at a point between said axial end and said clamping lug; said clamping lug having transverse dimensions that are greater than and less than the width of said slot; whereby said clamping lug may pass through slot when disposed in one position while being unable to pass therethrough when disposed in another position on said pin.

4. A quick-change tool holder of the character described, comprising; a rotatable member having an axial end and a tapered socket extending axially inwardly therefrom; at least one driving key carried by said axial end and projecting axially thereof; at least one pin element projecting axially of said driving key; at least one clamping lug carried on the projecting end of said pin member and being rotatable around the axis of said pin; a tool holder adapted to concentrically seat within said socket and having a radial flange intermediate its axial ends; said flange having at least one radial slot extending inwardly from its peripheral edge whereby said slot of said flange may be positioned around said driving key at a point between said axial end and said clamping lug; said clamping lug being eccentrically mounted about the axis of said pin.

5. A quick-change tool holder of the character described, comprising; a rotatable member having an axial end and a tapered socket extending axially inwardly therefrom; at least one driving key carried by said axial end and projecting axially thereof; at least one pin element projecting axially of said driving key; at least one clamping lug carried on the projecting end of said pin member and being rotatable around the axis of said pin; a tool holder adapted to concentrically seat within said socket and having a radial flange intermediate its axial ends; said flange having at least one radial slot extending inwardly from its peripheral edge whereby said slot of said flange may be positioned around said driving key at a point between said axial end and said clamping lug; said clamping lug being rotatable relatively of said socket, said driving key and said pin and overlying said radial flange upon rotatation thereof, whereby axial separation of said member and said holder seated therein is prevented; said clamping lug moving towards said axial end upon rotation thereof around the axis of said pin; and means for limiting the extent of said movement of said lug towards said axial end.

6. The device of claim 5 further characterized by the fact that said lug rotates relatively of said pin.

7. The device of claim 6 further characterized by the presence of means for holding said lug in one position on said pin.

References Cited in the file of this patent

UNITED STATES PATENTS

| | | |
|---|---|---|
| 2,583,264 | Herrmann | Jan. 22, 1952 |
| 2,719,722 | Nickless | Oct. 4, 1955 |
| 2,727,748 | Benjamin et al. | Dec. 20, 1955 |